April 23, 1968  O. SINGER ET AL  3,378,971
BUILDING STRUCTURES AND JOINT MEMBERS THEREFOR
Filed Aug. 12, 1963  4 Sheets-Sheet 3

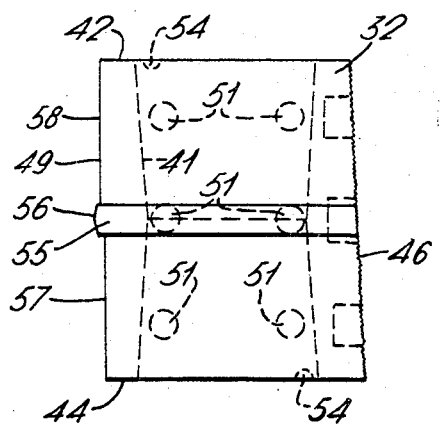
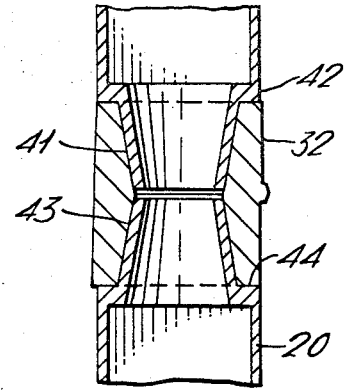
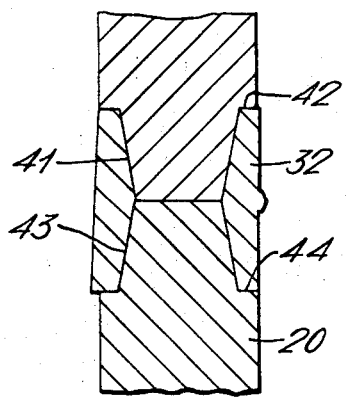
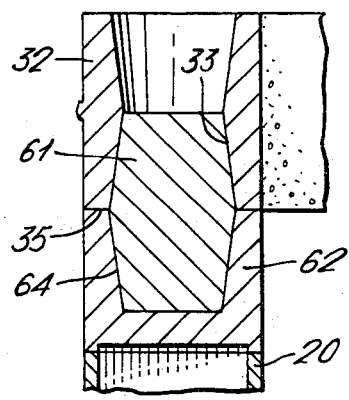
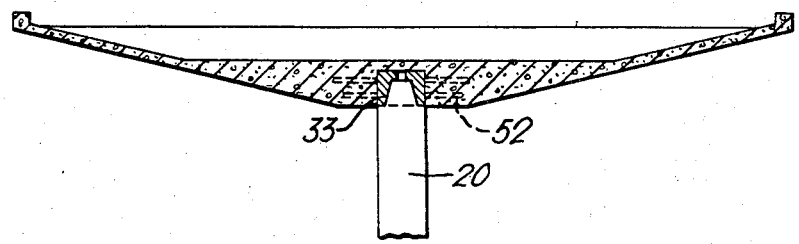

United States Patent Office 3,378,971
Patented Apr. 23, 1968

3,378,971
BUILDING STRUCTURES AND JOINT
MEMBERS THEREFOR
Oscar Singer, 10 Dorland Court, West Hill, London SW.
15, England, and Jan Bobrowski, North Cheam, England; said Bobrowski assignor to said Singer
Filed Aug. 12, 1963, Ser. No. 301,673
Claims priority, application Great Britain, Aug. 17, 1962, 31,751/62; Jan. 4, 1963, 565/63
4 Claims. (Cl. 52—263)

The invention relates to building structures and to joint members therefor.

The invention provides a building structure comprising at least one substantially horizontal member, which could be a floor or floor member, or roof or roof member, supported from at least one substantially vertical member which could be a column or other supporting member by means of at least one tapered spigot and socket joint.

Preferably the tapered spigot is provided by a spigot member comprising a tapered abutment surface and a shoulder abutment surface transversely of the tapered abutment surface at the broader end thereof, and the tapered socket is provided by socket member comprising abutment surfaces abutting with the aforesaid tapered and shoulder abutment surfaces respectively of the spigot member. Preferably there is provided means for preventing relative rotation between the members of an assembled joint, which means comprises a part-spherical recess in the shoulder abutment surface of the spigot member, a corresponding part-spherical recess in the corresponding abutting surface of the socket, and a spherical member substantially filling the space formed by the two adjacent recesses, to prevent relative rotation of the spigot member and socket member.

Preferably a joint member is incorporated in a floor member or roof member so that the said latter member is supported at least partially through the joint member, which joint member has at least one face engaging with the supported member which face is inclined to the direction of thrust on the joint whereby relative movement along the aforesaid direction between the supported member and the joint member incorporated therein is restrained. Preferably a joint member incorporated in a floor member or roof member has two sets of abutment surfaces for abutting respectively the abutment surfaces of two joint members incorporated in two supporting structural members respectively and positioned on opposite sides respectively of the aforesaid joint member. Preferably two joint members, incorporated respectively in two laterally adjacent roof members or floor members, are in contact with each other and are such that they are in contact with each other only along a line or narrow strip which lies in or substantially in the common neutral surface of bending of the two structural members.

Preferably the angle of taper of the joint is less than thirty degrees, preferably less than ten degrees. Preferably the tapered abutment surface is frusto-conical or part frusto-conical.

Preferably a slab is supported by at least one column by means of at least one tapered spigot and socket joint effecting a rigid distortion resistant connection between the slab and the column.

The invention includes, in or for a building structure as aforesaid, a joint member comprising a tapered spigot adapted to mate with a tapered socket to transmit the supporting load, to locate the supported member accurately in relation to the supporting member and to resist relative movement between them.

The invention also includes, in or for a building structure as aforesaid, a joint member comprising a tapered socket adapted to mate with a tapered spigot to transmit the supporting load, to locate the supported member accurately in relation to the supporting member and to resist relative movement between them.

A specific embodiment of the invention, together with some modifications thereof, will now be described by way of example and with reference to the accompanying drawings in which:

FIGURE 8 is an elevation of the socket in the direction of the arrow VIII in FIGURE 6.

FIGURE 9 is a sectional view of a spigot and socket assembly in which the transverse abutment surfaces at the narrow end of the spigot do not touch each other.

FIGURE 10 is a sectional view of a spigot and socket assembly in which solid spigots and columns are used and the transverse abutment surface at the narrow end of one spigot is in contact with the corresponding surface of the second spigot.

FIGURE 11 shows the use of a dowel inserted into the end of a column.

FIGURE 12 shows the application of the invention to "butterfly" and "mushroom" roofs.

The building structure of this example forms the basic structure of a habitable building for use, for instance, as offices or apartments, and includes a number of floor members such as 11, 12, 13, 14 and 15. In this example these floor members are in the form of rectangular reinforced concrete slabs. Each slab is supported by means of four supporting members, each in the form of a steel column, such as 21, 22, 23 and 24. In this example, each slab is thus supported at each of its four corners.

The columns and slabs are fitted together by means of tapered spigot and socket joints. In this example, a spigot joint member such as 31 is incorporated in each end of each column, with the tapering spigot pointing in a direction along the length of the column. A corresponding socket joint member such as 32 is incorporated in each corner of each slab. In this example, each socket member is adapted to receive two spigots, one above the slab and one below it.

Figure 4:
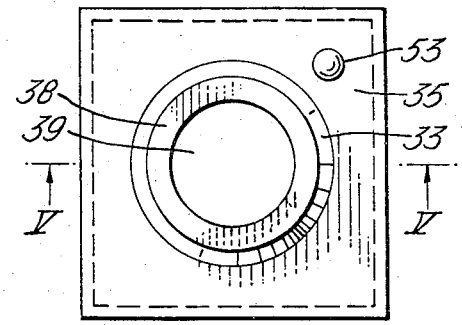
FIGURE 4 is a plan view of a spigot member incorporated in the column.
Figure 5:
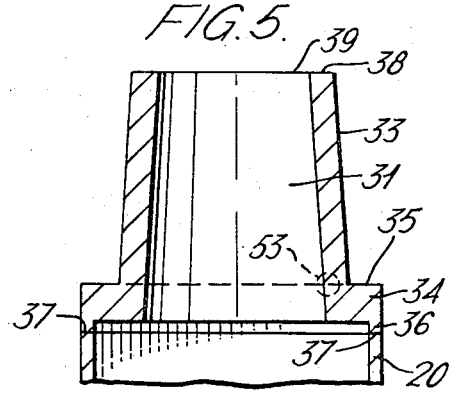
FIGURE 5 is a sectional view on the line V—V of FIGURE 4.

A spigot member of this example is illustrated in FIGURES 4 and 5, and is of generally frusto-conical form. It has an external tapered abutment surface 33 of part-conical form. A flange 34 of square shape extends radially outwards around the broader end of the tapered spigot. This flange provides a shoulder abutment surface 35 transversely of the tapered abutment surface 33. The square flange 34 carries around its four sides a further flange 36 extending axially a sort distance away from the tapered surface. The free end of this flange 36 contacts the upper end of the square column 20. The column is hollow and the spigot member is incorporated rigidly in the column by means of a welded joint 37. In this example, the spigot member 31 is hollow and the narrower end of its tapered surface provides an annular surface 38 which surrounds a circular aperture 39 in the end of the spigot.

Figure 6:
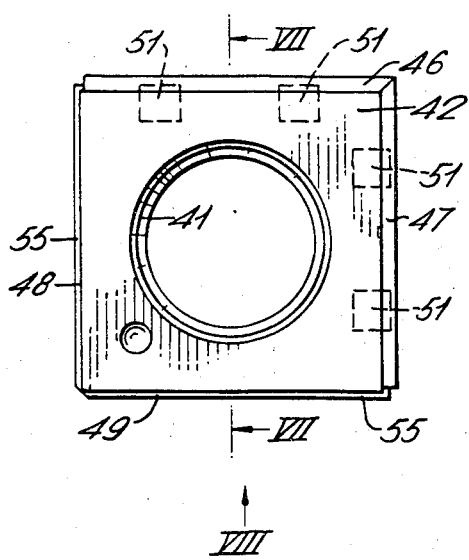
FIGURE 6 is a plan view of a socket member which is incorporated in a floor member of the building structure.
Figure 7:
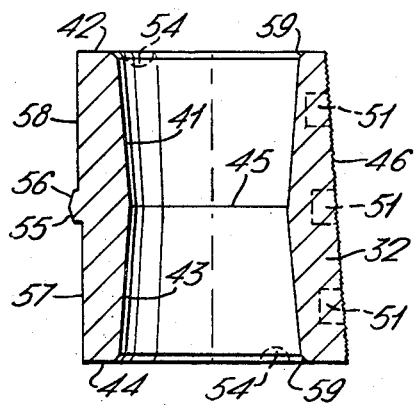
FIGURE 7 is a sectional view on the line VII—VII of FIGURE 6.

The double socket member shown in FIGURES 6, 7 and 8 is generally of tubular form. It has an exterior shape of square section, and has two sets of abutment surfaces. One set comprises a tapered abutment surface 41 of part-conical form for abutting the tapered surface 33 of a socket, and a transverse abutment surface 42 at one end for abutting the transverse surface 35 of the spigot. The other set of abutment surfaces likewise comprise a tapered abutment surface 43 and a transverse abutment surface 44 for abutting with the respective abutment surfaces of a second spigot. The two part-conical surfaces 41 and 43 meet at a line 45 mid-way between the ends of the socket member, the interior of which thus has a venturi-like shape.

The spigot member 31 and socket member 32 are both of cast steel and the surfaces 33, 35, 41, 42, 43 and 44 are carefully machined to accurate predetermined dimensions. The relative dimensions are such that, when a spigot member is inserted into a socket member and is thrust, by the weight of the slab, with a force of several tons into the socket member, the two tapered surfaces 33 and 41 (for example) abut each other and are in contact substantially all over both surfaces.

In this example, each spigot member is four inches high between its surfaces 39 and 35, and is four inches in diameter at its narrow end. The angle of taper (i.e. the angle between the axis of the conical surface, and a line of greatest slope) is five degrees.

The socket members of this example are each incorporated in one corner of a concrete slab. Thus each socket member has two adjacent side surfaces 46 and 47 which are in contact with the concrete of the slab, and two other adjacent side surfaces 48 and 49 which, when the socket member is incorporated in a building structure, face corresponding side surfaces of adjacent socket members. Each socket member is rigidly incorporated in its concrete slab by several means, which will now be described. Firstly, each surface 46 and 47 is provided with six tapped holes 51 into which are screwed threaded anchoring bars 52, which are additional to the usual reinforcement of the concrete. (For convenience of illustration, only four such anchoring bars are shown on the respective faces of socket members in FIGURE 2.) The outside faces 46 and 47 are left rough cast and are not machined, so that their rough surface helps the concrete to key to the socket. Furthermore, the faces 46 and 47 are inclined to the axis of the socket. These faces slope outwardly and downwardly of the socket when it is incorporated in the slab. Should there be any tendency for the slab of a floor member or roof member in which the socket is incorporated to slip down the socket (in spite of the screw connections between the socket and the anchoring bars 52), the inclined faces 46 and 47 exert a wedging action between the socket and the slab which restrains the slip.

In this example, each floor member is twenty feet long, ten feet wide and eight inches thick.

Each spigot member has a substantially hemispherical recess 53 in its transverse abutment surface 35. Likewise each socket member has a substantially hemispherical recess 54 in each of its transverse abutment surfaces 42 and 44. The surfaces of each recess are machined smooth, and the diameters of each recess are the same, and each recess is the same radial distance from the respective axis of the spigot or socket member. Thus when the spigot is received in the socket member so that the surface 35 of the spigot abuts the surface 42 of the socket, the spigot and socket can be positioned with respect to each other rotationally about their common axis so that the two hemispherical recesses are aligned to provide a spherical chamber. This chamber is filled by a steel ball-bearing which provides a key between the spigot and the socket to prevent relative rotation.

The two side faces 48 and 49 of each socket each have a projecting rim 55 extending across the face mid-way between the top and bottom of the sockets. Each rim has a double bevel so that the most outwardly projecting part is provided by a narrow strip 56. When a number of floor members are assembled together in the building structure, it is this strip 56 on each socket member which contacts a corresponding strip on an adjacent socket member. The lower part 57 below the rim 55 on each face 48 and 49 is set back by ⅛" from the part 58 of the faces 48, 49 above the rim 56. The increased clearance between the lower parts 57 of adjacent faces allows for rotation of end surfaces due to vertical deflection of the floor or roof member and makes easier the task of assembling adjacent members.

Figure 1:
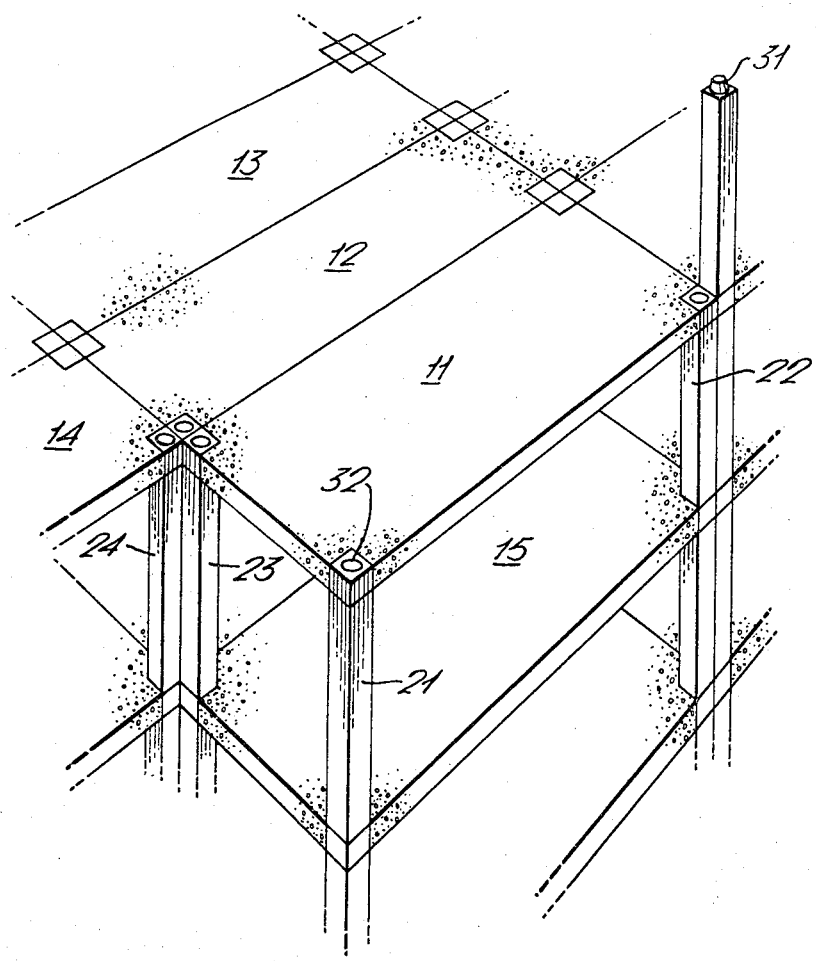
FIGURE 1 is a perspective view showing a habitable building structure during the course of construction.
Figure 2:
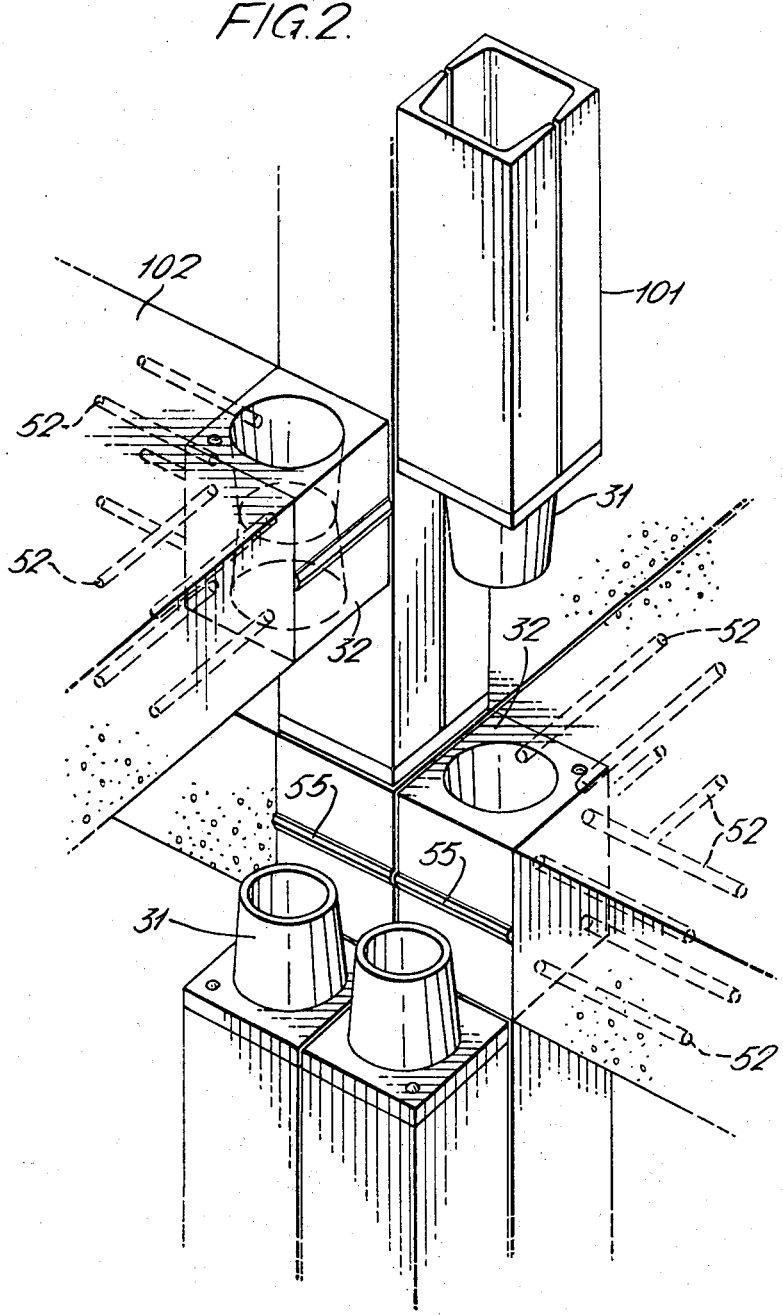
FIGURE 2 is a perspective view of some spigot and socket joints incorporated in the building structure, only partly assembled for convenience of illustration.
Figure 3:
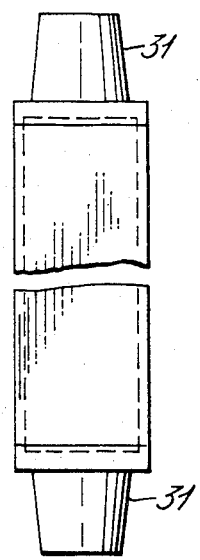
FIGURE 3 is an elevation of a column forming part of the building structure, part broken away for convenience of illustration.

In this example, each column is constructed from two lengths of steel channel girder which are welded together to form a column of square external section, as is illustrated in FIGURE 2. The spigot members are first cast and are then welded into position one on each end of the column. The abutment surfaces of each spigot are then accurately machined to the desired dimensions. Machining the abutment surfaces after the welding operation has the advantage that any changes in shape or dimension due to thermal effects of the welding do not alter the final machined dimensions of the abutment surfaces. The machined faces are then protected by suitable means while the columns incorporating them are transported until they are ready for assembly in a building.

The various spigot members used in this example building structure are all carefully constructed so that they are substantially identical with each other, at least insofar as the dimensions and relative positions of the various abutment surfaces. Likewise, the various columns are all constructed to have accurately the same dimensions between the abutment cases at opposite ends of the column. Thus the columns are interchangeable one with another, and any column may be used in any position in the building.

Likewise each socket member is constructed to be substantially identical with each other socket member, at least insofar as the dimensions and relative positions of the various abutment surfaces. Furthermore, all structural floor members are constructed to have accurately the same respective dimensions of between the abutment surfaces of the sockets incorporated therein. Consequently the distance between opposite end faces and opposite side faces, and the diagonal distances between opposite corners of the member, are accurate. Thus floor structural members are interchangeable one with another.

In the construction of the floor or roof structural members, the socket members are first cast or fabricated or made from a square bar and accurately machined to the required dimensions. They are then positioned accurately in a mould. The mould can be cast or fabricated, stress relieved and then machined so as to permit accurate location of the sockets and to hold them rigidly in position during casting. The fixing of the sockets is such that they can be released to allow for shrinkage movement. The concrete slab may include steel reinforcing members running both along and across the slab, e.g. in the form of two separate layers of reinforcing logs. When the concrete has set the jigs are removed and the completed floor member removed from the mould. The machined surfaces of the socket members are protected while the floor member is transported to the site to be incorporated in the building structure.

In order to erect the building structure, a single floor member is first positioned on suitable foundations at ground level and is levelled as required, e.g. by means of screw jacks. Further floor members are then positioned at ground level adjacent the first floor member. One possible method of doing this is to position columns in the adjacent sockets of two adjacent slabs and to adjust the position of one of the slabs until the tops of the columns are correctly positioned adjacent each other. This may be done by using a specially constructed jig comprising two socket members rigidly attached laterally adjacent to each other, to check the positions of the tops of two adjacent columns.

When the ground floor structural members have been positioned, a column is supported from each corner of each floor member. The tapered spigot and socket assists in the entry of the spigot into the socket member. In this example, the outside end of the tapering abutment surfaces 41 and 43 in each socket member is provided with an additional bevel 59 to further facilitate entry of the spigot into the socket and to facilitate fit. Before the shoulder abutment surface 35 of the spigot reaches the shoulder abutment surface 42 of the socket, a steel ball-bearing of the correct size is placed in the recess 54 on the shoulder abutment surface of the socket. The column is then lowered until its shoulder abutment surface rests on this steel ball. The column and spigot are then rotated about their axis until the part-spherical recess 53 in the spigot member aligns with the steel ball so that the spigot can completely enter the socket. When the tapered abutment surfaces of the spigot and the socket abut each other, the column is accurately aligned with respect to the floor structural member and is accurately held in position due to the wedging action of the tapered spigot and socket joint.

When four columns have been erected on top of each bound floor member, a further floor member is lowered into position so that its four lowermost sockets engage the four spigots on top of the four columns. When the tapered abutment surfaces of the various spigots and sockets fully engage each other, the upper floor member is accurately located with respect to the columns and the lower floor member, and it is also held in position due to the wedging action of the tapered spigots and sockets. Further columns and floor members are added as desired. FIGURE 2 which shows a column 101 about to be lowered so that its lower spigot 32a enters a socket 32a; and also a floor member 102 about to be lowered so that one of its sockets 32b engages a spigot 31b underneath it. Walls and interior and exterior fittings are then added to complete the buiding.

The building structure of this example is advantageous in a number of ways. For instance, as mentioned previously, laterally adjacent sockets abut each other along the edge 56 of the rim 55 around two sides of the socket. This rim is positioned mid-way between the top and the bottom of the socket, so that it lies substantially in the neutral surface of the bending of the concrete slab of the floor member in which the socket is incorporated. Thus, should the concrete slab bend, the distance between the edges 56 at opposite ends or opposite sides of the slab will not substantially alter, since those edges are both in the neutral surface of the slab. Thus the dimension between the surfaces at opposite ends and opposite sides of a floor member (i.e. the surfaces 56) which abut laterally adjacent floor members do not alter very much even if the slab bends.

The tapered spigots and sockets make the assembly of each joint easy, since it does not demand much accuracy to initially insert the narrow end of a spigot into the wide end of a socket. When this has been done, the tapered abutment surfaces of the spigot and socket co-operate to guide the spigot into the socket and to its correct assembled position in which the two tapered surfaces are in contact with each other. When the spigot and socket are in this assembled position, the column in which the spigot is incorporated is accurately and rigidly positioned, by means of the joint alone, perpendicular to the slab in which the socket is incorporated. Thus it is possible to erect a building structure, such as described in the foregoing example, without the use of any jigs, plumb lines, levels or the like, after the ground floor slabs have been correctly aligned and positioned. Furthermore, the tapered spigot and socket construction of this example is such that the greater the thrust with which the spigot member and the socket member of a joint are pushed together, the more solidly they wedge together. Thus it is possible to construct a building of three or four stories height without any wind bracing. Buildings of up to ten stores or more may also be constructed without wind bracing provided that the building is wide enough.

The invention is not restricted to the details of the foregoing example. For instance, the spigot member may have a solid narrow end without any aperture. The spigot member and the socket member may be of any other convenient tapered form, e.g. of square pyramid form. Instead of being cast, the spigot member may be pressed out of steel of a convenient gauge.

Spigots may be incorporated in floor members and sockets in supporting members.

The construction of the floor structural members or roof structural members may be modified. For instance, a slab may have sockets or spigots positioned inwardly from its corners in any part of the slab. A slab may be supported through a single spigot and socket joint positioned at the centre of the slab. Alternatively, a slab may be supported through two such joints spaced apart, preferably on a centre line of the slab. The joints may then be positioned one at each edge of the slab.

In the alternative form of construction of spigot shown in FIGURE 11, the tapered spigot is provided by a dowel member 61 which is received in a socket 62 on the end of a column 20. The dowel member 61 has an external tapered surface 33 which engages with the corresponding tapered surface in one half of a double socket 32 incorporated in a slab 63. A shoulder abutment surface 35 is provided by the end surface of the socket 62 on the column. In this example, the dowel member 61 has a second tapered surface 64 which engages with a corresponding tapered surface in the socket 62. However, the surface 64 on the dowel may alternatively be cylindrical, the socket 62 having a corresponding cylindrical surface.

What we claim is:

1. A building structure including at least two laterally adjacent substantially horizontal structural members, at least two dry spigot and socket joints, at least two vertical supporting members, each of the said joints include two parts, one part being a tapered spigot and the other part a mating tapered socket, the sockets being adapted to receive the spigots axially and abut against the spigots, the spigots and sockets being machined to such accuracy that each have in combination tapered load bearing abutment surfaces and transverse load bearing abutment surfaces, one part of each joint being secured to the said two horizontal structural members respectively, and the other part of each joint being secured to the two vertical supporting members respectively, the said horizontal structural members being connected to the said vertical supporting members by the said dry spigot and socket joints, with the axis of the spigots and sockets vertical, the tapered abutment surfaces being adapted to restrain relative horizontal movement between spigots and sockets in all directions, the said parts of each joint which are secured to the said two horizontal structural members, having each a narrow projecting rim, which lie substantially in the common neutral surface of bending of the two horizontal structural members.

2. A building structure as claimed in claim 1 in which the spigots have transverse load bearing abutment surfaces in the form of shoulder abutment surfaces transversely of the tapered surfaces at the broader ends thereof and the sockets also have transverse load bearing abutment surfaces in the form of shoulder abutment surfaces transversely of the tapered surfaces at the broader ends thereof.

3. A building structure including at least one substantially horizontal structural member, at least two vertical supporting members, at least two dry spigot and socket joints, each joint including two parts, one part being a tapered spigot member and the other part a mating tapered socket member, one each of the joint members being secured to each of the vertical supporting members and at least two of the joint members mating with the last mentioned joint members being secured to the horizontal structural member, the horizontal structural member being connected to the vertical supporting members by the dry spigot and socket joints, the axis of the joints being vertical, the spigots and sockets being machined to such accuracy that each have in combination tapered load bearing abutment surfaces and transverse load bearing abutment surfaces, the said joint members which are secured to the said horizontal structural member are supporting the said horizontal structural member, the last said joint members being made of a material different from the material of the said horizontal member, the last said joint members each having a face engaging with the said supported horizontal member which faces are rough whereby the material of the said horizontal member is helped to key to the said rough faces, including also anchoring bars which are partly secured in the last said joint members and are partly embedded in the said horizontal member thus structurally interconnecting the said joint members and the said horizontal member.

4. A building structure including at least one substantially horizontal structural member, at least two vertical supporting members, at least two dry spigot and socket joints, each joint including two parts, one part being a tapered spigot member and the other part a mating tapered socket member, one each of the joint members being secured to each of the vertical supporting members and at least two of the joint members mating with the last mentioned joint members being secured to the horizontal structural member, the horizontal structural member being connected to the vertical supporting members by the dry spigot and socket joints, the axis of the joints being vertical, the spigots and sockets being machined to such accuracy that each have in combination tapered load bearing abutment surfaces and transverse load bearing abutment surfaces, the said joint members which are secured to the said horizontal structural member are supporting the said horizontal structural member, the last said joint members each having a face engaging with the supported member which face is inclined to the direction of thrust on the joint to project towards the horizontal member at its lower edge whereby relative movement along the aforesaid direction between supported member and joint member incorporated therein is restrained, the said joint members being made of a material different from the material of the said horizontal member, the said inclined faces of the joint members being rough whereby the material of the said horizontal member is helped to key to the said rough faces including also anchoring bars, which are partly secured in the said joint members which are secured to the horizontal member and are partly embedded in the said horizontal member.

References Cited
UNITED STATES PATENTS

| | | | |
|---|---|---|---|
| 225,060 | 3/1880 | Johnson | 52—283 X |
| 689,387 | 12/1901 | Crossland | 52—726 |
| 915,421 | 3/1909 | Eisen | 52—252 X |
| 2,064,791 | 12/1936 | Faber | 52—167 |
| 2,708,846 | 5/1955 | Cherry | 52—252 |
| 3,199,300 | 8/1965 | Fiore | 52—726 X |

FRANK L. ABBOTT, *Primary Examiner.*

ALFRED C. PERHAM, *Examiner.*